US010274762B2

(12) United States Patent
Yu et al.

(10) Patent No.: US 10,274,762 B2
(45) Date of Patent: Apr. 30, 2019

(54) DISPLAY SUBSTRATE MOTHERBOARD, MANUFACTURING AND DETECTING METHODS THEREOF AND DISPLAY PANEL MOTHERBOARD

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Kun Yu, Beijing (CN); Changdi Chen, Beijing (CN); Qingyong Meng, Beijing (CN); Tao Yang, Beijing (CN); Shengchao Jiang, Beijing (CN); Yusheng An, Beijing (CN); Chunhui Wu, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 57 days.

(21) Appl. No.: 15/540,422

(22) PCT Filed: Dec. 5, 2016

(86) PCT No.: PCT/CN2016/108562
§ 371 (c)(1),
(2) Date: Jun. 28, 2017

(87) PCT Pub. No.: WO2017/114098
PCT Pub. Date: Jul. 6, 2017

(65) Prior Publication Data
US 2018/0024390 A1 Jan. 25, 2018

(30) Foreign Application Priority Data
Dec. 31, 2015 (CN) .......................... 2015 1 1030141

(51) Int. Cl.
G02F 1/13 (2006.01)
G02F 1/1333 (2006.01)
(Continued)

(52) U.S. Cl.
CPC ........ *G02F 1/1309* (2013.01); *G02F 1/13394* (2013.01); *G02F 1/133308* (2013.01);
(Continued)

(58) Field of Classification Search
CPC .................................................. G02F 1/1309
See application file for complete search history.

(56) References Cited

U.S. PATENT DOCUMENTS

2004/0119917 A1* 6/2004 Lim ..................... G02F 1/1309
349/110
2005/0024567 A1* 2/2005 Sawasaki .......... G02F 1/133707
349/123
(Continued)

FOREIGN PATENT DOCUMENTS

CN 203502701 U 3/2014
CN 203705750 U 7/2014
(Continued)

OTHER PUBLICATIONS

International Search Report and Written Opinion dated Mar. 2, 2017; PCT/CN2016/108562.
(Continued)

*Primary Examiner* — Sang V Nguyen
(74) *Attorney, Agent, or Firm* — Ladas & Parry LLP

(57) ABSTRACT

A display substrate motherboard and a manufacturing method and a detecting method thereof are provided. The display substrate motherboard includes a base substrate, a plurality of display substrate regions located on the base substrate to form a plurality of display substrates, and a plurality of spacer regions located among the display sub-
(Continued)

strate regions, at least one detecting region being disposed in the spacer regions. The detecting region includes at least one film layer. The display substrate region includes at least one film layer which is disposed in a same layer as the at least one film layer of the detecting region, the film layer of the detecting region having a same thickness as the film layers in the display substrate regions.

19 Claims, 11 Drawing Sheets

(51) Int. Cl.
*G02F 1/1335* (2006.01)
*G02F 1/1339* (2006.01)

(52) U.S. Cl.
CPC .. *G02F 1/133512* (2013.01); *G02F 1/133514* (2013.01); *G02F 1/133351* (2013.01)

(56) References Cited

U.S. PATENT DOCUMENTS

| | | | |
|---|---|---|---|
| 2009/0073357 A1* | 3/2009 | Takahashi | G02F 1/133516 349/106 |
| 2009/0281754 A1* | 11/2009 | Takatori | G09G 3/006 702/82 |
| 2010/0134667 A1* | 6/2010 | Suzuki | H04N 5/3572 348/294 |
| 2012/0268418 A1* | 10/2012 | Ishizaki | G06F 3/0412 345/174 |
| 2013/0076951 A1* | 3/2013 | Endo | H04N 5/361 348/308 |
| 2013/0155357 A1* | 6/2013 | Ota | G02F 1/133512 349/110 |
| 2014/0313448 A1* | 10/2014 | Kinoe | G02F 1/136209 349/46 |
| 2015/0060823 A1* | 3/2015 | Furuie | H01L 27/3223 257/40 |
| 2016/0027378 A1* | 1/2016 | Kim | G02B 6/0055 345/207 |
| 2016/0172385 A1* | 6/2016 | Noumi | H01L 27/124 257/72 |
| 2016/0343944 A1* | 11/2016 | Lee | H01L 27/3223 |

FOREIGN PATENT DOCUMENTS

| | | | | |
|---|---|---|---|---|
| CN | 104216153 A | | 12/2014 | |
| CN | 105182574 | * | 12/2015 | ............ G02F 1/13 |
| CN | 105182574 A | | 12/2015 | |
| CN | 105404041 A | | 3/2016 | |
| CN | 205374928 U | | 7/2016 | |
| JP | 2010-175585 A | | 8/2010 | |

OTHER PUBLICATIONS

The First Chinese Office Action dated Jun. 2, 2017; Appln. No. 201511030141.9.

* cited by examiner

DISPLAY SUBSTRATE MOTHERBOARD, MANUFACTURING AND DETECTING METHODS THEREOF AND DISPLAY PANEL MOTHERBOARD

TECHNICAL FIELD

At least one embodiment of the present disclosure relates to a display substrate motherboard and a manufacturing method and a detecting method thereof, and a display panel motherboard.

BACKGROUND

Generally, a basic structure of a thin film transistor liquid crystal display (TFT-LCD) comprises an array substrate, a color filter substrate and a liquid crystal layer arranged between the array substrate and the color filter substrate. The display device also comprises a pixel electrode and a common electrode for controlling the deflection of the liquid crystal molecules. In the TFT-LCD, the intensity of light can be controlled by controlling the deflection of the crystal liquid molecules, then color images display can be realized through filtration to the light by the color filter substrate. For example, the color filter substrate comprises a black matrix and color resin to display color. The array substrate and/or the color filter substrate is/are a display substrate.

Generally, in a producing process, a display substrate motherboard including a plurality of display substrates can be manufactured on one motherboard substrate to enhance productivity. After an upper display substrate motherboard and a lower display substrate motherboard (for example, an array substrate motherboard and a color filter substrate motherboard) are assembled, the assembled panel motherboard is cut into a plurality of small crystal liquid display panels.

In the process of manufacturing a display substrate, segment differences will be produced due to thickness differences of various layers and manufacturing sequence differences of various layers. In the cell assembling process, the surface of the display substrate is required to have a certain degree of flatness to avoid poor alignment of the coated alignment layers in the uneven regions to generate rubbing mura, so as to avoid impacting the display quality of the crystal display panel. It is necessary to measure and monitor different kinds of segment differences in the process of manufacturing display substrates.

SUMMARY

At least one embodiment of the present disclosure provides a display substrate motherboard and a manufacturing method and a detecting method thereof, and a display panel motherboard. Film thicknesses and segment differences can be accurately measured by combining the display panel motherboard with a segment difference probe, so that a problem of data output discrepancy caused by recognition differences of measurers about pixel contours can be solved, and film thicknesses can be measured without scratching the films.

At least one embodiment of the present disclosure provides a display substrate motherboard, and the display substrate motherboard comprises: a base substrate, a plurality of display substrate regions located on the base substrate to form a plurality of display substrates, and a plurality of spacer regions located among the display substrate regions. At least one detecting region is arranged in the spacer regions. The detecting region comprises at least one film layer, and the display substrate regions comprise at least one film layer which is provided in a same layer as the at least one film layer of the detecting region. The film layer in the detecting region has a same thickness as the film layer in the display substrate regions, which are provided in the same layer.

For example, in the display substrate motherboard provided in an embodiment of the present disclosure, each of the display substrate regions comprises a display pixel region, each of the detecting regions comprises a dummy pixel region, the at least one film layer included in the detecting regions is located in the dummy pixel region, and the at least one film layer included in the display substrate regions and provided in the same layer as the at least one film layer of the detecting regions is located in the display pixel region.

For example, in the display substrate motherboard provided in an embodiment of the present disclosure, a number of the film layers included in the dummy pixel region is less than or equal to a number of the film layers included in the display pixel region.

For example, in the display substrate motherboard provided in an embodiment of the present disclosure, each of the detecting regions has a peripheral frame, the peripheral frame surrounding the outside of the dummy pixel region, a blank region being provided between the peripheral frame and the dummy pixel region and configured to expose the base substrate.

For example, in the display substrate motherboard provided in an embodiment of the present disclosure, the display pixel regions comprise a plurality of display pixel units which are arranged in an array, each of the display pixel units comprises a plurality of display sub-pixel units. The dummy pixel region comprises a plurality of dummy pixel units which are arranged in an array, each of the dummy pixel units comprising a plurality of dummy sub-pixel units. A number of the dummy sub-pixel units in each of the dummy pixel units is equal to a number of the display sub-pixel units in each of the display pixel units, and a size of each dummy sub-pixel unit in each of the dummy pixel units is equal to a size of each display sub-pixel unit in each of the display pixel units one to one, respectively. At least one dummy sub-pixel unit and the display sub-pixel unit in the display pixel units which corresponds to the dummy sub-pixel unit comprise at least one part of the film layer located in a same layer of the dummy pixel regions and the display pixel regions, respectively.

For example, in the display substrate motherboard provided in an embodiment of the present disclosure, a plurality of detecting regions are provided, and the dummy pixel regions in the plurality of detecting regions are the same or are different from each other.

For example, in the display substrate motherboard provided in an embodiment of the present disclosure, each of the dummy pixel units in the dummy pixel regions of at least one detecting region is the same as each of the display pixel units in the display pixel regions of the display substrate regions.

For example, in the display substrate motherboard provided in an embodiment of the present disclosure, the at least one film layer located in the detecting regions comprises at least one of a black matrix layer and a color filter layer.

For example, in the display substrate motherboard provided in an embodiment of the present disclosure, the at least one dummy sub-pixel unit in the at least one dummy pixel unit only comprises at least one part of a black matrix layer.

For example, in the display substrate motherboard provided in an embodiment of the present disclosure, a plurality of dummy sub-pixel units which only comprise at least one part of the black matrix layer are arranged regularly in the dummy pixel regions.

For example, in the display substrate motherboard provided in an embodiment of the present disclosure, a plurality of dummy sub-pixel units which only comprise at least one part of the black matrix layer are arranged irregularly in the dummy pixel regions.

For example, in the display substrate motherboard provided in an embodiment of the present disclosure, each of the display pixel units comprises at least one of a red display sub-pixel unit, a green display sub-pixel unit, and a blue display sub-pixel unit.

For example, in the display substrate motherboard provided in an embodiment of the present disclosure, the display substrate motherboard comprises an array substrate motherboard, or a color filter substrate motherboard.

For example, in the display substrate motherboard provided in an embodiment of the present disclosure, the display substrate motherboard is a color filter substrate motherboard, and the peripheral frame is located in a same layer as a black matrix on the color filter substrate motherboard.

For example, in the display substrate motherboard provided in an embodiment of the present disclosure, an area of the dummy pixel region is smaller than an area of the display pixel region.

For example, in the display substrate motherboard provided in an embodiment of the present disclosure, the area of the dummy pixel region is smaller than one tenth of the area of the display pixel region.

At least one embodiment of the present disclosure provides a display panel motherboard, comprising the display substrate motherboard.

At least one embodiment of the present disclosure provides a method for manufacturing a display substrate motherboard, comprising: forming a plurality of display substrate regions on a base substrate, a region among the display substrate regions being a spacer region, and at least one detecting region being formed in the spacer region. The detecting region including at least one film layer, and the display substrate region including at least one film layer which is formed in a same layer as the at least one film layer of the detecting region.

For example, in the method for manufacturing a display substrate motherboard provided in an embodiment of the present disclosure, the film layer of the detecting region formed in the same layer as the film layer of the display substrate region are prepared by a patterning process.

At least one embodiment of the present disclosure provides a method for detecting the display substrate motherboard, comprising: and (1) determining positions of the detecting regions according to the designed position parameters; (2) detecting a thickness of at least one film layer in the detecting regions to obtain the thickness of the film layer in the display substrate regions located in a same layer as the detecting regions.

For example, in the method for detecting the display substrate motherboard provided in an embodiment of the present disclosure, each of the detecting regions is provided with a dummy pixel region therein, and each of the detecting regions has a peripheral frame, the peripheral frame surrounding the outside of the dummy pixel region, and a blank region being provided between the peripheral frame and the dummy pixel region and configured to expose the base substrate. The method for detecting a thickness of at least one film layer in the detecting regions comprises translating a segment difference probe from the blank region of the detecting regions to the dummy pixel region.

BRIEF DESCRIPTION OF THE DRAWINGS

In order to demonstrate clearly technical solutions of the embodiments of the present disclosure, the accompanying drawings in relevant embodiments of the present disclosure will be introduced briefly. It is apparent that the drawings may only relate to some embodiments of the disclosure and not intended to limit the present disclosure.

REFERENCE NUMERALS

100—display substrate motherboard; 101—base substrate; 102—display substrate region; 103—spacer region; 104—detecting region; 105—black matrix; 1051—black matrix; 106—display pixel unit; 107—display sub-pixel unit; 108—display pixel region; 109—dummy pixel region; 110—peripheral frame; 111—blank region; 112—dummy pixel unit; 113—dummy sub-pixel unit; 114—color filter layer; 1141—color filter layer; 115—blue display sub-pixel unit; 116—green display sub-pixel unit; 117—red display sub-pixel unit; 1151—blue dummy sub-pixel unit; 1161—green dummy sub-pixel unit; 1171—red dummy sub-pixel unit; 200—mask plate; 201—base substrate of mask plate; 202—display substrate region; 203—spacer region; 204—detecting region; 2051—black matrix; 206—display sub-pixel region; 208—display pixel region; 209—dummy pixel region; 210—peripheral frame region; 212—dummy sub-pixel region; 214—transparent region; 215—non-transparent region; 300—probe.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is apparent that the described embodiments are just a part but not all of the embodiments of the disclosure. Based on the described embodiments herein, those skilled in the art can obtain other embodiment(s), without any creative work, which shall be within the scope of the disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. Also, the terms, such as "a," "an," or the like, are not intended to limit the amount, but indicate the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

Figure 1:
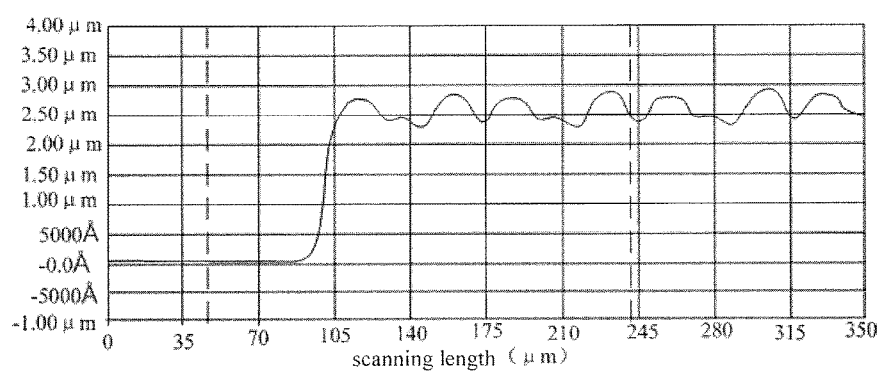
FIG. 1 is a diagram illustrating the output data measured by a segment difference probe.

In the process of producing display substrate motherboard, when measuring and monitoring segment differences, steepness (a step height), gradient and roughness of the surface of the crystal liquid display substrate motherboard can be measured by a contact probe on the segment difference probe. With the thin-film transistor industry becoming more and more competitive, the number of the pixels in each inch becomes more and more, the measurement of the segment difference probe runs into a bottleneck. As an example, for the measurements of film thicknesses and segment differences on a color filter substrate motherboard, in the process of measuring, for instance, a knife is used to scratch films in a panel region to scratch off a small part of a color resin layer and a black matrix layer of the panel, and this position is used as a measuring reference surface, then, a height of the black matrix, a height of the blue sub-pixels, a height of the green sub-pixels, and a height of the red sub-pixels are measured, and the data output is illustrated in FIG. 1. The shortcomings of the measurement method are: firstly, it's hard to distinguish contours of the blue sub-pixels, the green sub-pixels, and the red sub-pixels, and each tester has different recognition of the contours of each sub-pixel, while the selected regions are also different, such that it's difficult to determine real film thicknesses of the blue sub-pixels, the green sub-pixels and the red sub-pixels; secondly, artificially scratching films is required before detecting, and the position of scratching the films is also uncertain each time, and in the detecting process, it is also needed to search the scratching film region, which wastes lots of time and manpower; finally, residues and margins not wholly scratched and generated in the film scratching process also have an impact on film thickness measurement of the segment difference probe.

At least one embodiment of the present disclosure provides a display substrate motherboard and a manufacturing method and a detecting method thereof, and a display panel motherboard. The display substrate motherboard comprises a base substrate, a plurality of display substrate regions located on the base substrate to form a plurality of display substrates, and a plurality of spacer regions located among the display substrate regions. At least one detecting region is arranged in the spacer regions, the detecting region including at least one film layer, and the display substrate region including at least one film layer which is arranged in a same layer as the at least one film layer of the detecting regions.

The display substrate motherboard can accurately measure film thicknesses and segment differences of at least one film layer in the detecting regions to obtain film thicknesses and segment differences in the display substrate regions by using a segment difference probe, because the film layer in the detecting regions is located in a same layer as the correspondent film layer in the display substrate regions, so it can accurately present true values of film thicknesses in the display substrate regions to solve the problem of data output discrepancy caused by recognition differences of measurers about pixel contours and film scratching process, and solve the problem of misjudging the process conditions caused by data output discrepancy, which improves the accuracy of segment difference measurement and saves manpower and time. And film thickness can be measured without scratching the film.

For example, the display substrate motherboard 100 may be an array substrate motherboard, or a color filter substrate motherboard. As an example, the following embodiments are illustrated in which the display substrate motherboard 100 is a color filter substrate motherboard.

First Embodiment

Figure 2:
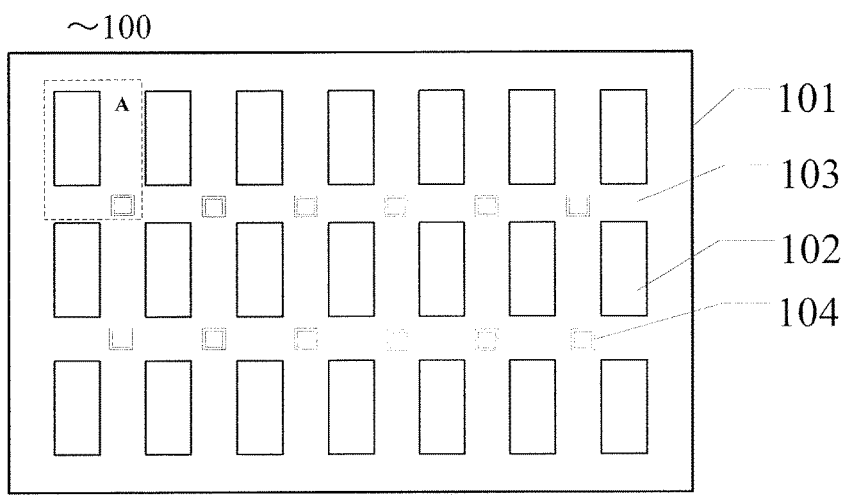
FIG. 2 is a schematic diagram of a display substrate motherboard.

The present embodiment provides a display substrate motherboard, as illustrated in FIG. 2. FIG. 2 is a schematic diagram of a display substrate motherboard 100 regions. The display substrate motherboard 100 comprises a base substrate 101, a plurality of display substrate regions 102 located on the base substrate 101 to form a plurality of display substrates, and a plurality of spacer regions 103 located among the display substrate regions, at least one detecting region 104 being arranged in the spacer regions 103. FIG. 2 shows 21 display substrate regions 102 and 12 detecting regions 104, but, the numbers of the display substrate regions 102 and the detecting regions 104 included in the display substrate motherboard are not limited thereto. One display substrate may be formed in one display substrate region correspondingly. For example, the display substrate motherboard is a color filter substrate motherboard.

Figure 3:
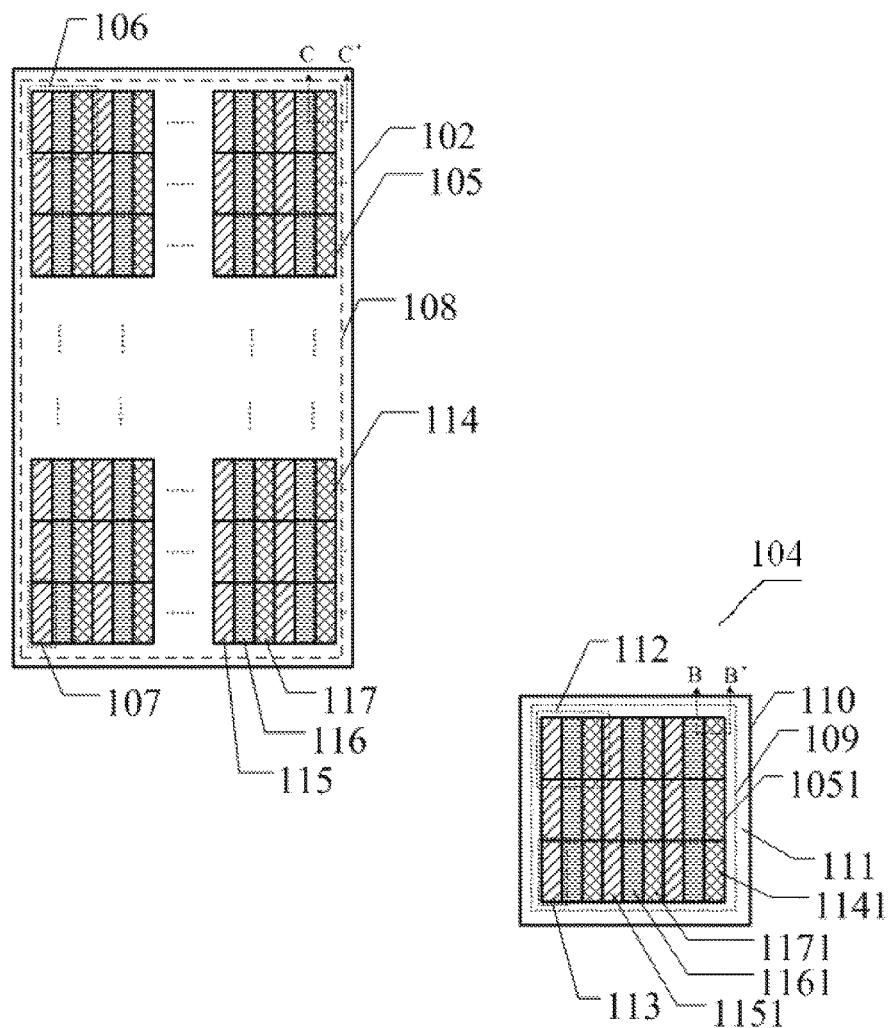
FIG. 3 is a schematic view of a region shown in the dotted box A in FIG. 2.

FIG. 3 is a schematic diagram of the region shown in the dotted box A in FIG. 2. FIG. 3 is used to clearly illustrate the inner structure corresponds to the display substrate region 102 and the detecting region 104.

Figure 4A:
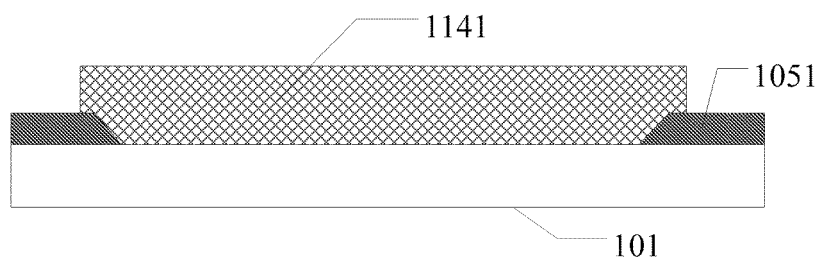
FIG. 4a, FIG. 4b and FIG. 4c are schematic sectional views along B-B', C-C', and along both B-B' and C-C' in FIG. 3, respectively.
Figure 4B:
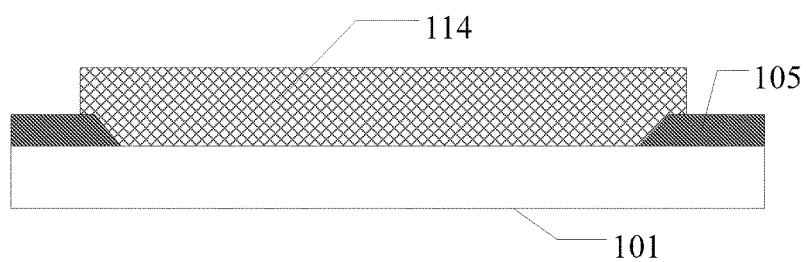
Figure 4C:
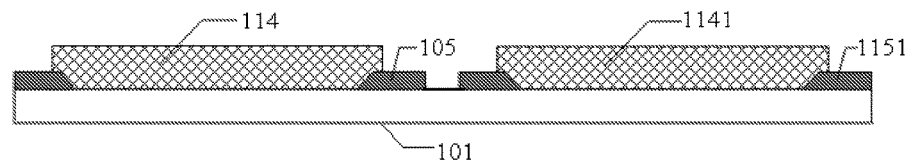

The detecting region 104 comprises at least one film layer, and the display substrate region 102 comprises at least one film layer which is arranged in a same layer as the at least one film layer of the detecting region 104. As illustrated in FIG. 4a, the detecting region 104 comprises two film layers 1141, 1051, and as illustrated in FIG. 4b, the detecting region 102 comprises two film layers 114, 105 located in a same layer as the two film layers 1141, 1051 in the detecting region 104, respectively. As shown in FIG. 4c, the film layer 1141 is arranged in a same layer as the film layer 114, the film layer 1051 is located in a same layer as the film layer 105. It is noted that a detecting region comprising two film layers and a display substrate region comprising two film layers located in a same layer as the two film layers in the detecting region, respectively, is an example. The detecting region may comprise a single film layer, or more than two film layers, accordingly, the display substrate region comprises at least one film layer located in a same layer as the at least one film layer in the detecting region. The display substrate region may comprise a single film layer located in a same layer as the at least one film layer in the detecting region, also in addition, the display substrate region may also comprise other film layers, however, the embodiments are not limited thereto. For example, in an example of the present embodiment, the number of the film layers included in the dummy pixel region is less than or equal to the number of the film layers included in the display pixel region.

For example, the film layer in the detecting region has a same thickness as the film layer located in the same layer in the display substrate region. In this way, characteristic information, such as a thickness of the film layer in the display substrate region located in a same layer as the detecting region can be obtained by detecting a film layer located in the detecting region.

The display substrate motherboard provided by the present embodiment can accurately measure film thicknesses and segment differences of at least one film layer in the detecting regions to obtain film thicknesses and segment differences in the display substrate regions by using a segment difference probe, because the film layer in the detecting regions is located in a same layer as the corresponding film layer in the display substrate regions. It can accurately present true values of film thicknesses in the display substrate regions to solve the problem of data output discrepancy caused by recognition differences of measurers about pixel contours and film scratching process, and solve the problem of misjudging the process conditions caused by data output discrepancy, which improves the accuracy of segment difference measurement and saves manpower and time. And film thickness can be measured without scratching the film.

For example, in an example of the present embodiment, as illustrated in FIG. 3, the display substrate region 102 comprises a display pixel region 108. The dummy pixel region 109 is arranged in the detecting region 104. At least one film layer included in the detecting region 104 is located in the dummy pixel region 109. The at least one film layer included in the display substrate region 102 and arranged in a same layer as the at least one film layer of the detecting region 104 is located in the display pixel region 108.

For example, in an example of the present embodiment, as illustrated in FIG. 3, each of the detecting region 104 has a peripheral frame 110, the peripheral frame 110 surrounding the outside of the dummy pixel region 109. A blank region 111 is located between the peripheral frame 110 and the dummy pixel region 109 and configured to expose the base substrate 101. The arrangement of the peripheral frame 110 is convenient for finding the detecting region 104 in the detecting process to save time. The blank region 111 may be used as a horizontal reference when the segment difference probe is used for measurement. It is noted that the detecting region 104 may have no peripheral frame 110, however, the embodiments are not limited thereto. For example, in an example of the present embodiment, as illustrated in FIG. 3, the display substrate motherboard 100 is a color filter substrate motherboard, and the peripheral frame 110 is located in a same layer as the black matrix 105 on the color filter substrate motherboard.

For example, in an example of the present embodiment, as illustrated in FIG. 3, the display pixel region 108 comprises a plurality of display pixel units 106 which are arranged in an array, each of the display pixel units 106 comprises a plurality of display sub-pixel units 107.

The dummy pixel region 109 comprises a plurality of dummy pixel units 112 which are arranged in an array, each of the dummy pixel units 112 comprises a plurality of dummy sub-pixel units 113.

A number of the dummy sub-pixel units 113 in each of the dummy pixel units 112 is equal to a number of the display sub-pixel units 107 in each of the display pixel units 106, and a size of each dummy sub-pixel unit 113 in each of the dummy pixel units 112 is equal to a size of each display sub-pixel unit 107 in each of the display pixel units 106 in one-to-one correspondence.

For example, being equal to each other in one-to-one correspondence herein refers to that the size of each display sub-pixel unit 107 for displaying a same color is equal to the size of each dummy sub-pixel unit 113 correspondingly. For example, the size of the blue dummy sub-pixel unit 1151 is equal to the size of the blue display sub-pixel unit 115 correspondingly, the size of green dummy sub-pixel unit 1161 is equal to the size of the green display sub-pixel unit 116 correspondingly, and the size of red dummy pixel unit 1171 is equal to the size of the red display sub-pixel unit 117 correspondingly.

At least one dummy sub-pixel unit 113 and the display sub-pixel unit 107 in the display pixel units 106 and corresponding to the dummy sub-pixel unit 113 comprise at least one part of the film layer located in a same layer of the dummy pixel regions 109 and the display pixel regions 108, respectively.

For example, in an example of the present embodiment, each of the display pixel units comprises at least one of a red display sub-pixel unit, a green display sub-pixel unit and a blue display sub-pixel unit, however, the embodiments are not limited thereto.

For example, each of the display pixel units 106 comprises a blue display sub-pixel unit 115, a green display sub-pixel unit 116 and a red display sub-pixel unit 117, that is to say, each of the display pixel units 106 comprises three primary colors of blue, green and red, however, the embodiments are not limited thereto. Correspondingly, each of the dummy pixel units 112 may comprise a blue dummy sub-pixel unit 1151, a green dummy sub-pixel unit 1161 and a red dummy sub-pixel unit 1171, however, the embodiments are not limited thereto.

It is noted that the arrangement of the display sub-pixel units and the dummy sub-pixel units are not limited to the arrangement of the array as illustrated in FIG. 3, other arrangement manners can also be adopted, such as a "卄" grapheme/inverted T shape, however, the embodiments are not limited thereto.

To clearly illustrate the structure of various film layer, as an example, a color filter substrate has a black matrix layer and a color filter layer, as illustrated in FIG. 4a and FIG. 4b, which are schematic sectional views along B-B' and C-C' in FIG. 3, respectively. Each of the dummy sub-pixel units 113 comprises at least one part of the black matrix layer 1051 and at least one part of the color filter layer 1141 on the base substrate 101; and each of the display sub-pixel units 107 comprises at least one part of the black matrix layer 105 and at least one part of the color filter layer 114 on the base substrate 101. As shown in FIG. 3, the dummy sub-pixel unit 113 in the dotted box comprises at least one part (such as a part in the dotted box) of the black matrix layer 1051 and at least one part (such as a part in the dotted box) of the color filter layer 1141; and the display sub-pixel unit 107 comprises at least one part (such as a part in the dotted box) of the black matrix layer 105 and at least one part (such as a part in the dotted box) of the color filter layer 114 on the base substrate 101.

As illustrated in FIG. 3, FIG. 4a and FIG. 4b, for example, at least one film layer included in the detecting regions 104 comprises at least one of the black matrix layer 1051 and the color filter layer 1141. The dummy sub-pixel unit 113 comprises at least one part of the black matrix layer 1051 and/or the color filter layer 1141, and the display sub-pixel unit 107 comprises at least one part of the black matrix layer 105 and/or the color filter layer 114. It is noted that the dummy sub-pixel unit 113 may only comprise at least one part of the black matrix layer 1051, or only comprise at least one part of the color filter layer 1141. The black matrix layer 105 and the black matrix layer 1051 are arranged in a same layer, and the adoption of different reference signs is for distinguishing that the black matrix layer 105 and the black matrix layer 1051 are located in the display pixel region 108 and the dummy pixel region 109, respectively. The color filter layer 114 and the color filter layer 1141 are arranged in a same layer, and the adoption of different reference signs is for distinguishing that the color filter layer 114 and the color filter layer 1141 are located in the display pixel region 108 and the dummy pixel region 109, respectively. The film layer in the display pixel region (the display substrate region) and the film layer in the dummy pixel region (the detecting region), which are arranged in a same layer, can be obtained by patterning a same film layer.

For example, in an example of the present embodiment, the number of the detecting regions 104 may be multiple, the dummy pixel regions 109 in a plurality of detecting regions are the same or are different from each other. The dummy pixel regions 109 in a plurality of detecting regions are the same refers to, for example, the structures of the dummy pixel units or the dummy sub-pixel units in the dummy pixel regions 109 in different detecting regions are the same, respectively, and each of the dummy sub-pixel units comprises a same number of film layers. The dummy pixel regions 109 in a plurality of detecting regions are different from each other refers to, for example, the structures of the dummy pixel units and the dummy sub-pixel units in the dummy pixel regions 109 in different detecting regions are different from each other, respectively, for example, the number of the film layers included in the dummy sub-pixel units in the dummy pixel regions 109 in different detecting regions is not the same. Due to the dummy pixel regions 109 in a plurality of detecting regions 104 being different from each other, morphologies, thicknesses and/or segment differences of different film layers can be detected in different detecting regions, for example, morphologies and film thicknesses of at least one of the dummy pixel units, the dummy sub-pixel units, the color filter layer and the black matrix can be obtained. The information, such as film thicknesses of each of the dummy sub-pixel units, segment differences among the dummy pixel units, angle segment differences (the height difference between the top of the color resin coated on the margin parts of the black matrix and the top of the parts not coated by the color resin of the black matrix is called as an angle segment difference), segment differences of peripheral dummy pixel units, or the like, can be accurately obtained by data comparison. In this way, morphologies and film thicknesses of at least one of the display pixel units, the display sub-pixel units, the color filter layer and the black matrix can be obtained, and the information, such as film thicknesses of each of the display sub-pixel units, segment differences among the display pixel units, angle segment differences, segment differences of peripheral display pixel units, or the like, can be accurately obtained by data comparison.

For example, in an example of the present embodiment, each of the dummy pixel units 112 in the dummy pixel regions 109 in at least one detecting region 104 is the same as each of the display pixel units 106 in the display pixel regions 108 in the display substrate regions 102. Each of the dummy pixel units 112 is the same as each of the display pixel units 106. The morphologies and film thicknesses of the dummy pixel units can be clearly obtained, and the morphologies and film thicknesses of the display pixel units can be obtained.

The display substrate motherboard provided by the present embodiment can accurately measure film thicknesses and segment differences of the film layer in the dummy pixel regions of the detecting regions to obtain film thicknesses and segment differences in the display pixel regions by using a segment difference probe, because the film layer in the detecting regions is located in a same layer as the corresponding film layer in the display pixel regions, and the dummy pixel units correspond to the display pixel units. It can accurately present true values of film thicknesses in the display pixel regions to solve the problem of data output discrepancy caused by recognition differences of measurers about pixel contours and film scratching process, and solve the problem of misjudging the process conditions caused by data output discrepancy, which improves the accuracy of segment difference measurement and saves manpower and time. And the film thickness can be measured without scratching the film.

Figure 5:
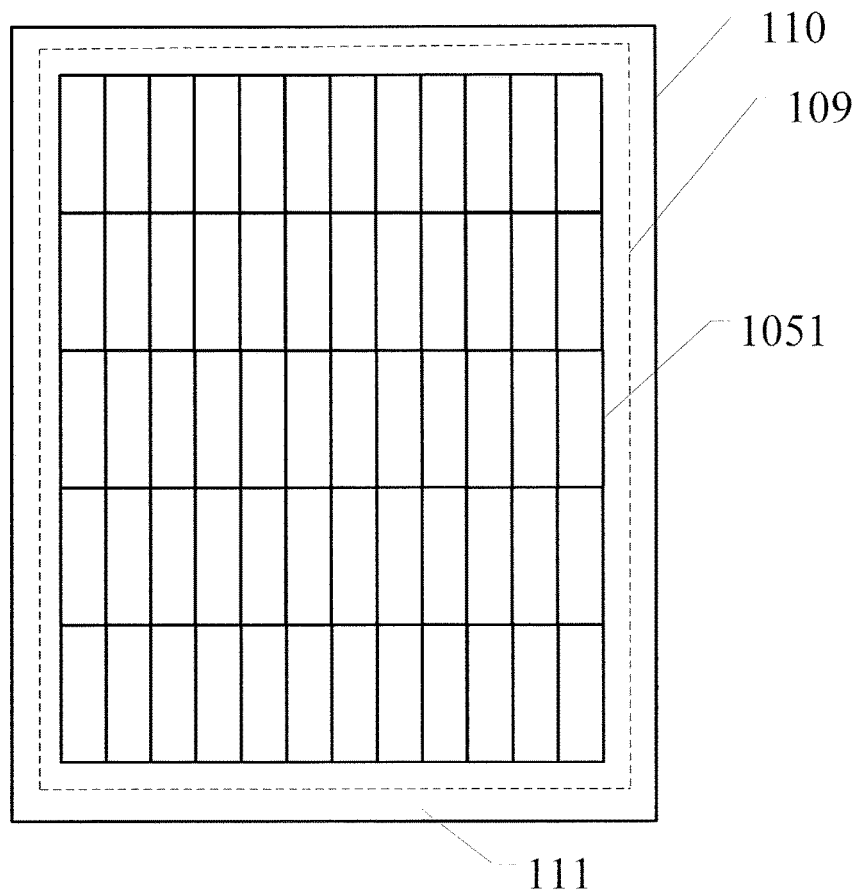
FIG. 5 is a schematic diagram of the black matrix in detecting regions, or a schematic diagram of a dummy pixel region in the detecting regions which only includes a black matrix.

For example, in an example of the present embodiment, at least one dummy sub-pixel unit 113 in at least one dummy pixel unit 112 only comprises at least one part of a black matrix layer 1051. For example, FIG. 5 is a schematic diagram of each of the dummy sub-pixel units 113 in each of the dummy pixel units 112 in the detecting regions only comprises at least one part of a black matrix layer. The morphology and film thickness of the black matrix in the dummy pixel regions can be detected by the arrangement of the detecting regions, in this way, the morphologies and film thicknesses of the black matrix in the dummy pixel regions can be obtained.

Figure 6:
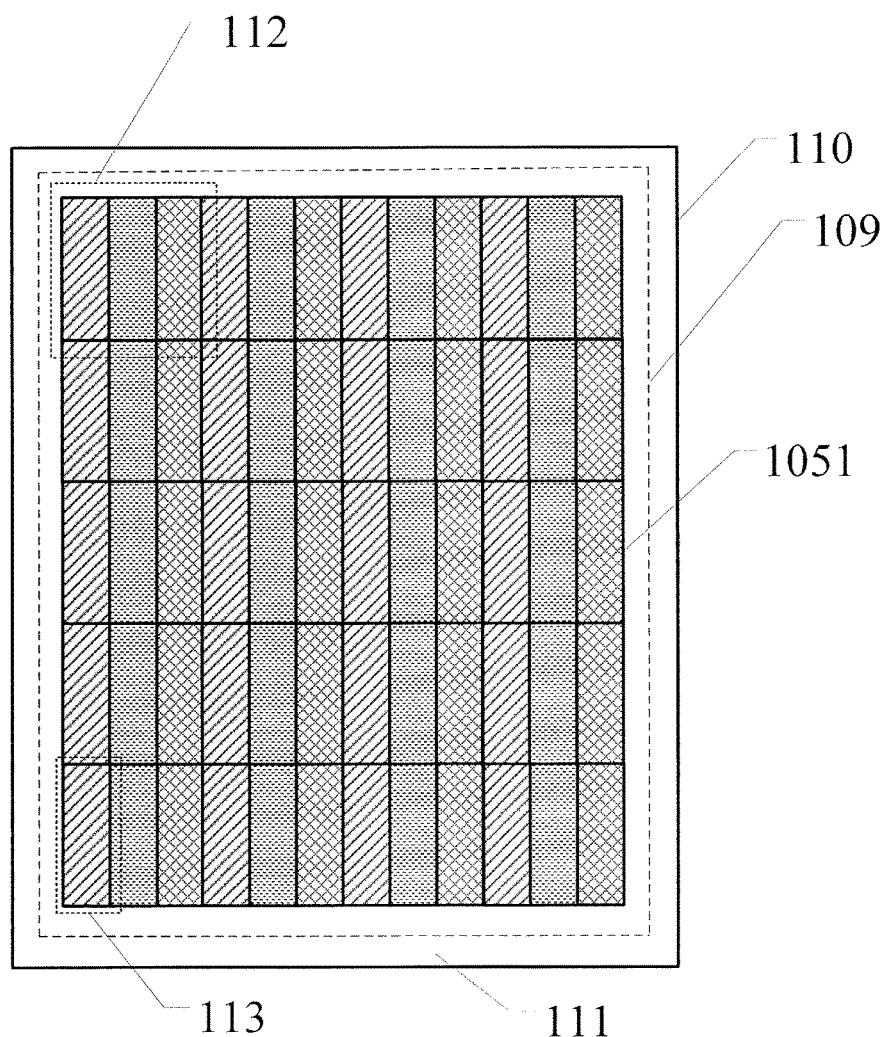
FIG. 6 is a schematic diagram of a dummy pixel region of the detecting regions with blue, green and red dummy sub-pixel units.

For example, FIG. 6 is a schematic diagram of detecting regions with blue, green and red dummy sub-pixel units and dummy pixel regions of the detecting regions; the morphologies and film thicknesses of the dummy pixel units can be accurately obtained by detecting the detecting regions. In this way, the morphologies and film thicknesses of the display pixel units in the display pixel regions can be obtained.

Figure 7:
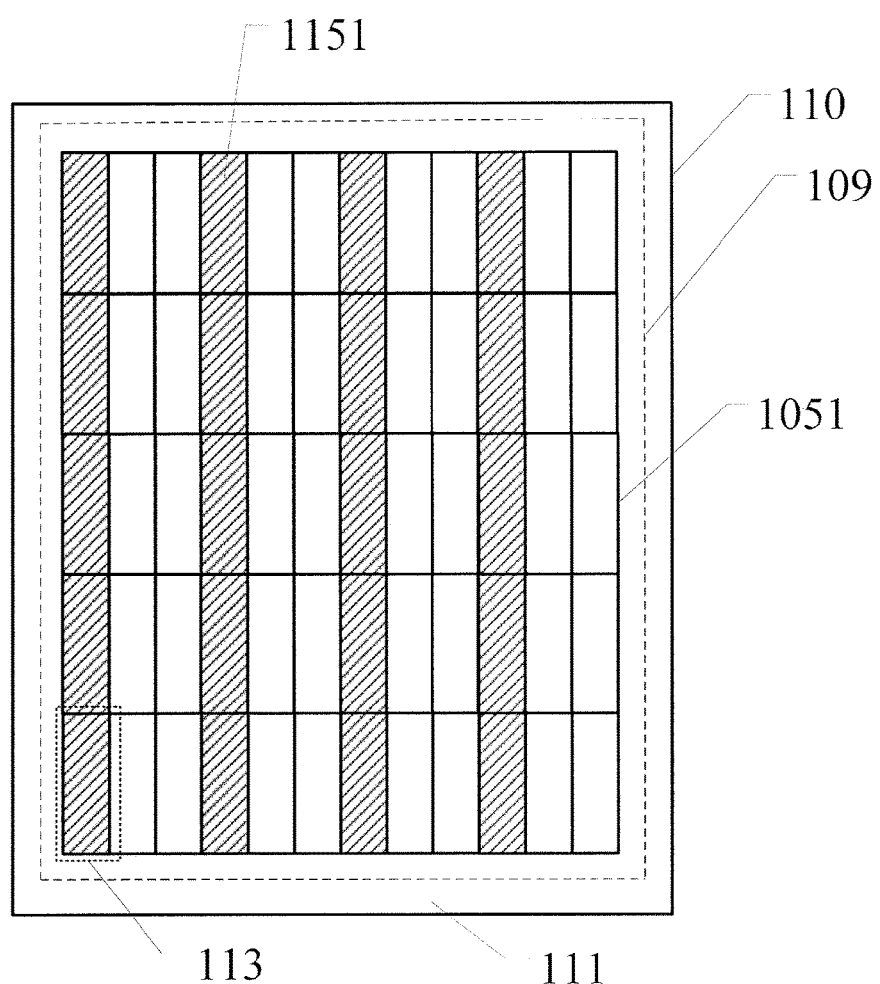
FIG. 7 is a schematic diagram of a dummy pixel region of the detecting regions with dummy sub-pixel units in a single color.

For example, FIG. 7 is a schematic diagram of the detecting regions with dummy sub-pixel units in one color, and a dummy pixel region in the detecting regions. As an example, FIG. 7 is illustrated in which only blue dummy sub-pixel units are provided. Morphologies and film thicknesses of the blue dummy sub-pixel units and the black matrixes can be obtained by detecting the detecting regions. In this way, morphologies and film thicknesses of the blue display sub-pixel units and the black matrixes in the display pixel regions can be obtained. Dummy sub-pixel units with a single other color is also allowed, however, the embodiments are not limited thereto.

For example, at least one dummy sub-pixel unit in at least one dummy pixel unit only comprises at least one part of a black matrix layer.

Figure 8:
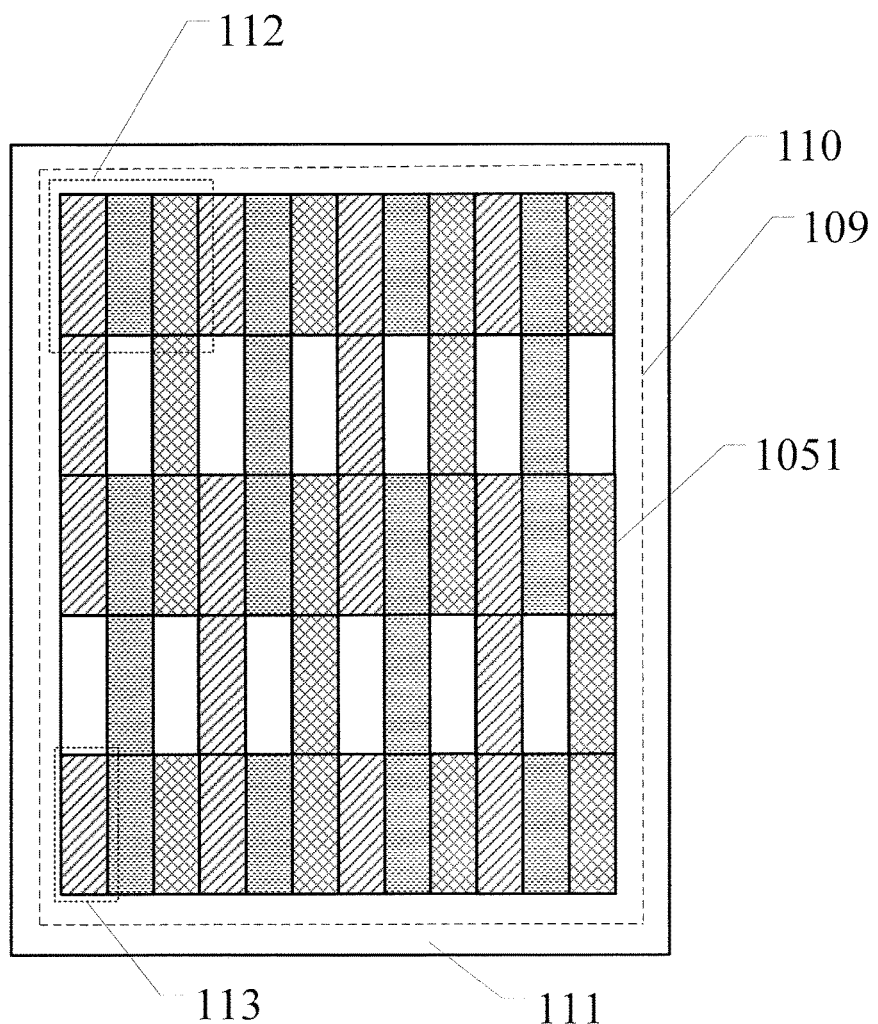
FIG. 8 is a schematic diagram of a dummy pixel region in the detecting regions partly with blue dummy sub-pixel units, green dummy sub-pixel units and red dummy sub-pixel units.

For example, a plurality of dummy sub-pixel units 113 which only comprise at least one part of the black matrix layer 1051 are arranged regularly or irregularly in the dummy pixel regions 109. For example, FIG. 7 and FIG. 8 shows situations of a plurality of dummy sub-pixel units 113 which only comprise at least one part of the black matrix layer 1051 arranged regularly and irregularly in the dummy pixel regions 109 respectively. In this way, film thicknesses and morphologies of the dummy pixel units, the dummy sub-pixel units and the black matrixes in the dummy pixel regions can be obtained, so that the film thicknesses and morphologies of the display pixel units in the display pixel regions, the display sub-pixel units and the black matrixes can be obtained.

For example, FIG. 8 is a schematic diagram of a dummy pixel region in the detecting regions partly with blue dummy sub-pixel units, green dummy sub-pixel units and red dummy sub-pixel units (part of the dummy sub-pixel units only comprises at least one part of the black matrix). In this way, morphologies and film thicknesses of the dummy pixel units, the dummy sub-pixel units and the black matrixes in the dummy pixel regions can be obtained. The information, such as segment differences among the dummy pixel units, angle segment differences, segment differences of peripheral dummy pixel units, or the like can be accurately obtained by data comparison. In this way, the morphologies and film thicknesses of the display pixel units, the display sub-pixel units and the matrixes in the display pixel regions can be obtained, and the information, such as segment differences among the display pixel units, angle segment differences, segment differences of peripheral display pixel units, or the like, can be obtained.

In an example of the present embodiment, as shown in FIG. 3, for example, the area of the dummy pixel region 109 is smaller than the area of the display pixel region 108.

In an example of the present embodiment, the area of the dummy pixel region 109 is smaller than one tenth of the area of the display pixel region 108. Furthermore, for example, the area of the dummy pixel region 109 is smaller than one fifteenth of the area of the display pixel region 108. Furthermore, for example, the area of the dummy pixel region 109 is smaller than one twentieth of the area of the display pixel region 108. The limitation of the relative size of the area of the dummy pixel region 109 and the display pixel region 108 can allow the film thicknesses and the segment differences to be detected while the production efficiency and the display effect are not affected.

It is noted that the embodiment of the present is illustrated, in which the display substrate motherboard is a color filter substrate motherboard, as an example, the display substrate motherboard may also be an array substrate motherboard, however, the embodiments are not limited thereto. For example, in an instance that the display substrate motherboard is an array substrate motherboard, the display sub-pixel unit can comprise film layers, such as a gate insulating layer, a gate layer, a source/drain electrode layer, a pixel electrode layer, a passivation layer, a common electrode layer, or the like, and the dummy sub-pixel units can comprise at least one film layer arranged in a same layer as the at least one of the film layers described above.

Second Embodiment

The present embodiment provides a display panel motherboard, and the display panel motherboard comprises any one of the display substrate motherboards 100 in the first embodiment.

For example, in an instance that the display substrate motherboard is a color filter substrate, detecting region(s) can be arranged at the position of an array substrate motherboard corresponding to detecting region(s) of the color filter substrate motherboard, in which the array substrate motherboard is cell assembled with the color filter substrate motherboard, however, the embodiments are not limited thereto. For example, the detecting region(s) can be arranged on one of the color filter substrate motherboard and the array substrate motherboard, and the detecting region(s) is/are not arranged on the other one of the color filter substrate motherboard and the array substrate motherboard.

Third Embodiment

The present embodiment provides a method for manufacturing a display substrate motherboard, and the method comprises the following operations.

Forming a plurality of display substrate regions on a base substrate, the region among the display substrate regions being a spacer region; and forming at least one detecting region in the spacer region, the detecting region including at least one film layer, and the display substrate region including at least one film layer which is formed in a same layer as the at least one film layer of the detecting region.

By the method for manufacturing a display substrate motherboard described above, any one of the display substrate motherboards in the first embodiment can be obtained.

For example, in an example of the present embodiment, the film layers formed in a same layer of the detecting region and the display substrate region are formed by a patterning process.

It is understood that, in the embodiments of the present disclosure, "in a same layer" refers to a layer structure which is used for forming a film layer by using a same film forming process to form a specific pattern, and then, the layer structure is formed by using a same mask by a patterning process. According to the difference of the specific pattern, one patterning process may comprise a plurality of exposures, developing and etching processes, and the specific patterns formed in the layer structure may be continuous, or discontinuous, and these specific patterns may have different heights or have different thicknesses.

For example, for the formation of a color filter substrate motherboard, it may includes: forming a black matrix on a base substrate, forming a color resin layer (including negative photoresist) on the base substrate which is provided with a black matrix, exposing the color resin layer (such as UV irradiation) by a mask, after the exposed color resin layer is developed, the remained part is the patterned color resin layer. For example, blue display sub-pixel units and blue dummy sub-pixel units are formed. Display sub-pixel units for displaying other colors may also be formed. That is, a plurality of dummy sub-pixel units are formed in dummy pixel regions in the detecting regions, and a plurality of display sub-pixel units are formed in display substrate regions. For example, the black matrixes in both the display substrate regions and the detecting regions are formed by patterning a same film layer, and both the display sub-pixel units and the dummy sub-pixel units to display a same color are formed in the display substrate regions and the detecting regions by patterning a same film layer.

Figure 9:
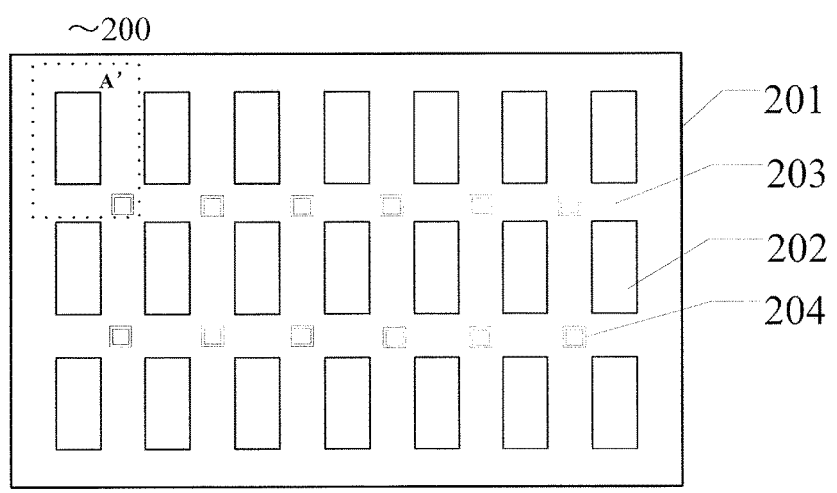
FIG. 9 is a schematic diagram of a mask region.

The present embodiment provides a mask plate 200 that can be used to manufacture any one of the display substrate motherboards in the first embodiment. FIG. 9 is a schematic diagram of the regions of the mask plate 200. The mask plate 200 comprises a plurality of display substrate regions 202 which corresponds to one film layer of the plurality of display substrates and a plurality of spacer regions 203 located among the display substrate regions, and at least one detecting region 204 is arranged in the spacer regions 203. As an example, the present embodiment is illustrated in which a color filter substrate motherboard is prepared, however, the present embodiments are not limited thereto.

FIG. 9 shows twenty one display substrate regions 202 and twelve detecting regions 204, but the number of the display substrate regions 202 and the number of the detecting regions 204 included in the mask plate are not limited thereto.

Figure 10:
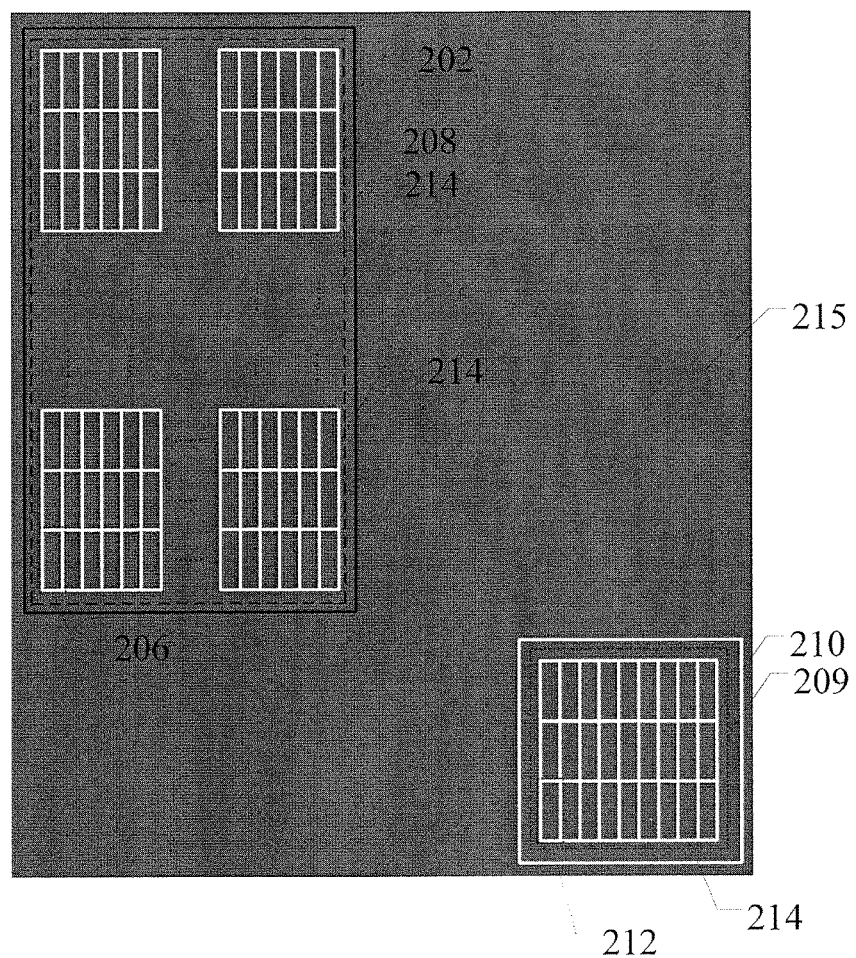
FIG. 10 is a schematic diagram of the region shown in the dotted box A' in FIG. 9.

FIG. 10 is a schematic diagram of the region shown in the dotted box A' in FIG. 9. As an example, FIG. 10 is illustrated in which a black matrix is formed in a display substrate motherboard. FIG. 10 clearly shows the structures of the display substrate regions 202 and the detecting regions 204. Each of the display substrate regions 202 comprises display pixel regions 208, each of the display pixel regions 208 including a plurality of display sub-pixel regions 206 in an array corresponding to a plurality of display sub-pixel units 107 (referring to FIG. 3).

Each of the detecting regions 204 is provided with a dummy pixel region 209, each of the dummy pixel regions 209 comprises a plurality of dummy sub-pixel regions 212 in an array corresponding to the formed plurality of dummy dub-pixel units 113 (referring to FIG. 3), and the size of the dummy pixel regions 212 is equal to the size of the display sub-pixel regions 206.

As shown in FIG. 9 and FIG. 10, for example, the white region is a transparent region 214 which is used for forming black matrixes in the corresponding regions, and other regions are non transparent regions 215. In this case, negative black photoresist can be used to form black matrixes.

For example, the mask plate comprises the base substrate 201 (as shown in FIG. 9) and mask patterns arranged on the base substrate 201, and the mask patterns comprise transparent regions 214 and non transparent regions 215.

In an example of the present embodiment, for example, each detecting region 204 has a peripheral frame region 210 in which to form the peripheral frame 110. The peripheral frame region 210 is a transparent region 214, and the peripheral frame region 210 surrounds the outside of the dummy pixel regions 209.

For example, the white region in FIG. 10 can also be a non transparent region, in this case, positive photoresist can be used to form black matrixes. Accordingly, in this case, if a peripheral frame region 210 is arranged, the peripheral frame region 210 is a non transparent region.

Figure 11:
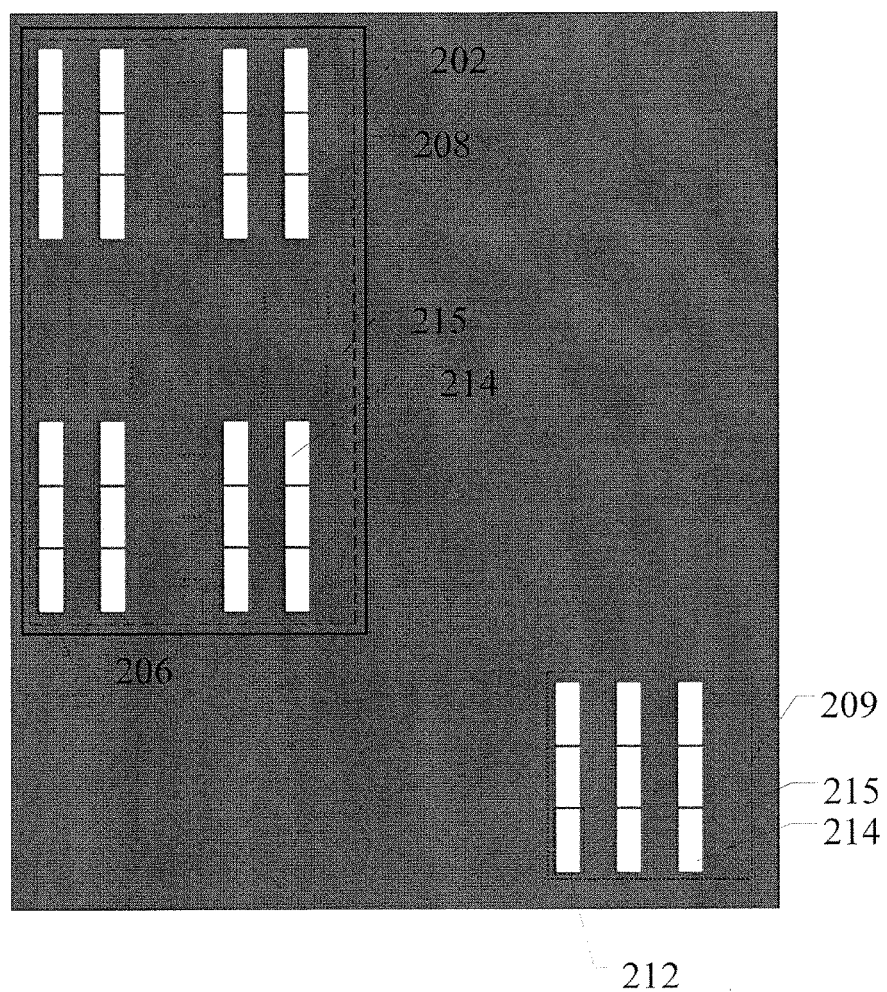
FIG. 11 is schematic diagram illustrating a mask plate design of the region as shown in the dotted box A' in FIG. 9 to form blue display sub-pixel units and blue dummy sub-pixel units.

For example, FIG. 11 is a schematic diagram of a mask plate design in the region shown in the dotted box A' in FIG. 9, and FIG. 11 shows the formed blue display sub-pixel units in the display pixel regions and blue dummy sub-pixel units in the dummy pixel regions. The transparent region 214 in FIG. 11 may be used to form blue display sub-pixel units and blue dummy sub-pixel units. For example, the mask plate shown in FIG. 11 can also be used to form display sub-pixel units and dummy sub-pixel units of other colors, however, the embodiments are not limited thereto.

Figure 12:
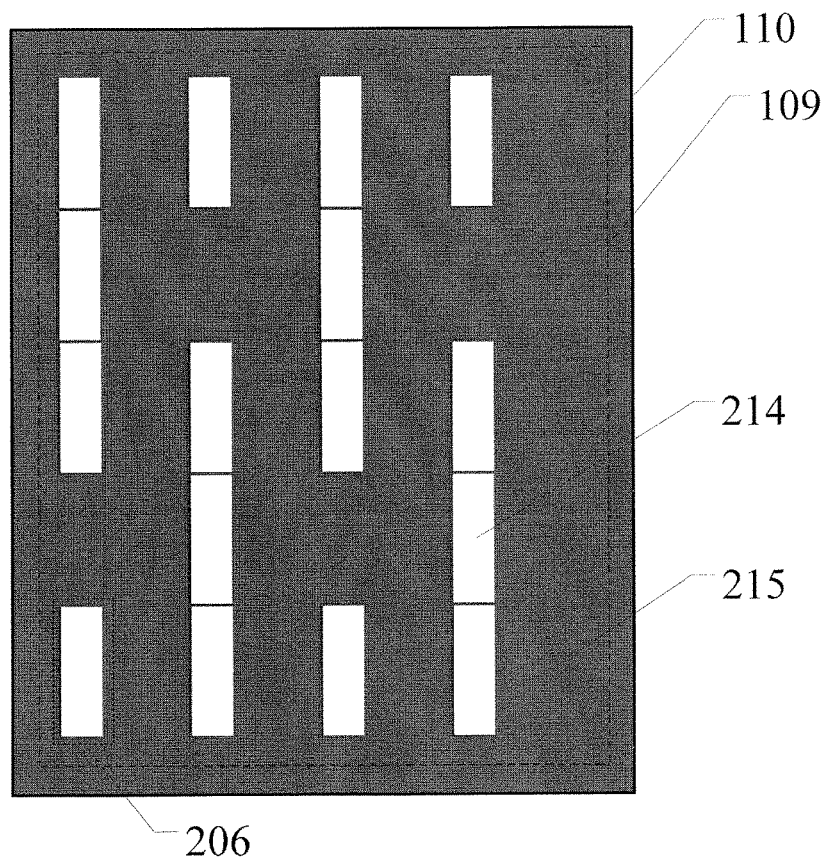
FIG. 12 is a schematic diagram illustrating a mask plate design of the detecting region to form blue dummy sub-pixel units as shown in FIG. 8.

FIG. 12 is a schematic diagram of a mask plate design in the detecting regions for forming the blue display sub-pixel units and the blue dummy sub-pixel units in FIG. 8. Similarly, display sub-pixel units and dummy sub-pixel units to display other colors in FIG. 8 can also be formed by using corresponding mask plates, however, the embodiments are not limited thereto.

For example, a plurality of detecting regions 204 are provided in the mask plate, and the dummy pixel regions 209 in the plurality of detecting regions 204 are the same or are different from each other, so that the same or different detecting regions can be formed accordingly to allow the film thickness and the segment difference to be detected.

For example, in the mask plate, each of the dummy sub-pixel units 213 in the dummy pixel regions 209 in at least one of the detecting regions 204 is the same as each of the display sub-pixel units 207 in the display pixel regions 208 in the display substrate regions 202, so that each of the dummy pixel units 112 in the display substrate motherboard is the same as each of the display pixel units 106.

It is noted that, all designs of the mask plates described above are designed according to the requirements of the display substrate motherboards. The mask plates can be designed according to the display substrate motherboard that needs to be formed correspondingly.

Fourth Embodiment

The present embodiment provides a method for detecting any one of the display substrate motherboards in the first embodiment by a segment difference probe, and the method comprises the following operations:

(1) determining positions of the detecting regions according to the designed position parameters;

(2) detecting a thickness of at least one film layer in the detecting regions to obtain the thickness of the film layer in the display substrate regions located in a same layer as the detecting regions, then obtaining the information of the display substrate regions. Information of the display substrate regions comprises, for example, morphologies, film thicknesses, segment differences, or the like, of the display substrate regions.

Figure 13:
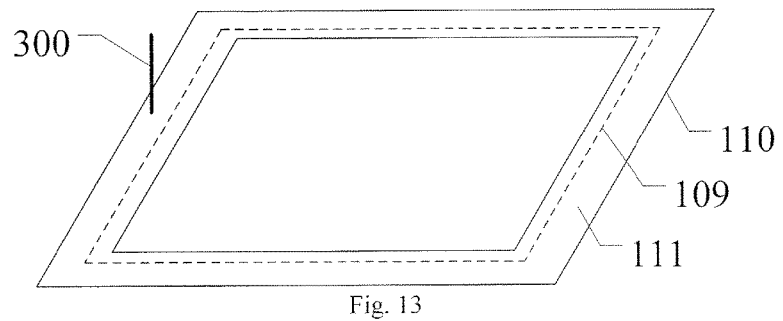
FIG. 13 is a schematic diagram of the segment difference probe detecting the detecting regions in the display substrate motherboard.

In an example of the present embodiment, for example, a dummy pixel region is arranged in each of the detecting regions, the detecting regions having a peripheral frame, the peripheral frame surrounding the outside of the dummy pixel regions, and a blank region being located between the peripheral frame and the dummy pixel regions and configured to expose the base substrate. The method for detecting a thickness of at least one film layer in the detecting regions comprises translating a segment difference probe from the blank region of the detecting regions to the dummy pixel region to detect it, as shown in FIG. 13.

For example, in a case of a peripheral frame is provided, for example, the detecting region can be quickly found according to the peripheral frame.

Several points to be noted:

(1) The drawings of the embodiments of the present disclosure may only involve structures to which the embodiments of the present disclosure relate, and other structures can refer to general design;

(2) Without conflict to each other, the embodiments of the present disclosures and features in the embodiments can be combined.

The described above are only exemplary embodiments of the present disclosure, and the present disclosure is not limited thereto. For one of ordinary skill in the art, various changes and alternations can be readily contemplated without departing from the technical scope of the present disclosure, which shall fall within the scope of the present disclosure. The scope of the present disclosure is defined by the appended claims.

The present application claims the priority to the Chinese Patent Application No. 201511030141.9 filed on Dec. 31, 2015, which is incorporated herein by reference as part of the disclosure of the present application.

What is claimed is:

1. A display substrate motherboard, comprising: a base substrate, a plurality of display substrate regions located on the base substrate to form a plurality of display substrates, and a plurality of spacer regions located among the display substrate regions;
wherein at least one detecting region is arranged in the spacer regions;
the detecting region comprises at least one film layer, and the display substrate regions comprise at least one film layer which is provided in a same layer as the at least one film layer of the detecting region; and
the film layer in the detecting region has a same thickness as the film layer in the display substrate regions, which are provided in the same layer;
wherein each of the display substrate regions further comprises a display pixel region, each of the detecting regions further comprises a dummy pixel region and a peripheral frame surrounding the outside of the dummy pixel region, the at least one film layer included in the detecting regions is located in the dummy pixel region, and the at least one film layer included in the display substrate regions and provided in the same layer as the at least one film layer of the detecting regions is located in the display pixel region; and a blank region is provided between the peripheral frame and the dummy pixel region and configured to expose the base substrate.

2. The display substrate motherboard according to claim 1, wherein a number of the film layers included in the dummy pixel region is less than or equal to a number of the film layers included in the display pixel region.

3. The display substrate motherboard according to claim 1, wherein
the display pixel regions comprise a plurality of display pixel units which are arranged in an array, each of the display pixel units comprises a plurality of display sub-pixel units;
the dummy pixel region comprises a plurality of dummy pixel units which are arranged in an array, each of the dummy pixel units comprising a plurality of dummy sub-pixel units;
a number of the dummy sub-pixel units in each of the dummy pixel units is equal to a number of the display sub-pixel units in each of the display pixel units, and a size of each dummy sub-pixel unit in each of the dummy pixel units is equal to a size of each display sub-pixel unit in each of the display pixel units one to one, respectively;
at least one dummy sub-pixel unit and the display sub-pixel unit in the display pixel units which corresponds to the dummy sub-pixel unit comprise at least one part of the film layer located in a same layer of the dummy pixel regions and the display pixel regions, respectively.

4. The display substrate motherboard according to claim 3, wherein a plurality of detecting regions are provided, the dummy pixel regions in the plurality of detecting regions are the same or are different from each other, and wherein each of the dummy pixel units in the dummy pixel regions of at least one detecting region is the same as each of the display pixel units in the display pixel regions of the display substrate regions.

5. The display substrate motherboard according to claim 4, wherein the at least one film layer located in the detecting regions comprises at least one of a black matrix layer and a color filter layer, the at least one dummy sub-pixel unit in the at least one dummy pixel unit only comprising at least one part of a black matrix layer.

6. The display substrate motherboard according to claim 5, wherein a plurality of dummy sub-pixel units which only comprise at least one part of the black matrix layer are arranged regularly, or irregularly, in the dummy pixel regions.

7. The display substrate motherboard according to claim 6, wherein each of the display pixel units comprises at least one of a red display sub-pixel unit, a green display sub-pixel unit, and a blue display sub-pixel unit.

8. The display substrate motherboard according to claim 1, wherein the display substrate motherboard comprises an array substrate motherboard; or a color filter substrate motherboard, a peripheral frame being located in a same layer as a black matrix on the color filter substrate motherboard.

9. The display substrate motherboard according to claim 8, wherein an area of the dummy pixel region is smaller than an area of the display pixel region.

10. The display substrate motherboard according to 9, wherein the area of the dummy pixel region is smaller than one tenth of the area of the display pixel region.

11. A display panel motherboard, comprising the display substrate motherboard according to claim 1.

12. A method for manufacturing a display substrate motherboard, comprising: forming a plurality of display substrate regions on a base substrate,
wherein a region among the display substrate regions is a spacer region, and at least one detecting region is formed in the spacer region, the detecting region including at least one film layer, and the display substrate region including at least one film layer which is formed in a same layer as the at least one film layer of the detecting region;
wherein each of the display substrate regions further comprises a display pixel region, each of the detecting regions further comprises a dummy pixel region and a peripheral frame surrounding the outside of the dummy pixel region, the at least one film layer included in the detecting regions is located in the dummy pixel region, and the at least one film layer included in the display substrate regions and provided in the same layer as the at least one film layer of the detecting regions is located in the display pixel region; and a blank region is provided between the peripheral frame and the dummy pixel region and configured to expose the base substrate.

13. The method for manufacturing a display substrate motherboard according to claim 12, wherein the film layer of the detecting region formed in the same layer as the film layer of the display substrate region are prepared by a patterning process.

14. A method for detecting the display substrate motherboard according to claim 1, comprising:
determining positions of the detecting regions according to the designed position parameters; and
detecting a thickness of at least one film layer in the detecting regions to obtain the thickness of the film layer in the display substrate regions located in a same layer as the detecting regions.

15. The method for detecting a display substrate motherboard according to claim 14, wherein each of the detecting regions is provided with a dummy pixel region, and each of the detecting regions has a peripheral frame, the peripheral frame surrounding the outside of the dummy pixel region, and a blank region being provided between the peripheral frame and the dummy pixel region and configured to expose the base substrate, and wherein the method for detecting a thickness of at least one film layer in the detecting regions comprises translating a segment difference probe from the blank region of the detecting regions to the dummy pixel region.

16. A method for detecting a display substrate motherboard, comprising:

providing at least one detecting region in spacer regions among a plurality of display substrate regions of the display substrate motherboard, determining a position of the detecting region according to designed position parameters, wherein the detecting region comprises at least one film layer, and the display substrate region comprises at least one film layer which is provided in a same layer as the at least one film layer of the detecting region, the film layer in the detecting region having a same thickness as the film layer in the display substrate regions, which are provided in the same layer; and detecting a thickness of at least one film layer in the detecting regions to obtain the thickness of the film layer in the display substrate regions provided in the same layer as the detecting regions;

wherein each of the display substrate regions further comprises a display pixel region, each of the detecting regions further comprises a dummy pixel region and a peripheral frame surrounding the outside of the dummy pixel region, the at least one film layer included in the detecting regions is located in the dummy pixel region, and the at least one film layer included in the display substrate regions and provided in the same layer as the at least one film layer of the detecting regions is located in the display pixel region; and a blank region is provided between the peripheral frame and the dummy pixel region and configured to expose the base substrate.

17. The method for detecting a display substrate motherboard according to claim 16, wherein a plurality of detecting regions are provided, the dummy pixel regions in the plurality of detecting regions being the same or being different from each other, and an area of a dummy pixel region being smaller than an area of a display pixel region; and wherein a number of the film layers included in the dummy pixel regions is less than or equal to a number of the film layers located in the display pixel regions.

18. The method for detecting a display substrate motherboard according to claim 17, wherein the area of a dummy pixel region is smaller than one tenth of the area of a display pixel region.

19. The method for detecting a display substrate motherboard according to claim 17, wherein the display substrate motherboard is a color filter substrate motherboard, and the peripheral frame is located in a same layer as a black matrix on the color filter substrate motherboard; and the method further comprises:

translating a segment difference probe from the blank region of the detecting regions to the dummy pixel region.

* * * * *